United States Patent
Kuenzner et al.

(10) Patent No.: US 7,225,413 B1
(45) Date of Patent: May 29, 2007

(54) DEVICE FOR CONTROLLING A DISPLAY SCREEN

(75) Inventors: Hermann Kuenzner, Freising (DE); Michael Herrler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/555,144

(22) PCT Filed: Nov. 24, 1998

(86) PCT No.: PCT/EP98/07571

§ 371 (c)(1), (2), (4) Date: Aug. 28, 2000

(87) PCT Pub. No.: WO99/27435

PCT Pub. Date: Jun. 3, 1999

(30) Foreign Application Priority Data

Nov. 25, 1997 (DE) ................................ 197 52 056
Sep. 22, 1998 (DE) ................................ 198 43 421

(51) Int. Cl. *G06F 3/00* (2006.01)
(52) U.S. Cl. ........................................... 715/834
(58) Field of Classification Search ........ 345/712–713, 345/853–855, 841, 968, 834; 379/142.17, 379/42.6, 433.04, 354; 455/566; 707/3–5; 715/834

See application file for complete search history.

(56) References Cited

U.S. PATENT DOCUMENTS

| 4,794,388 A | 12/1988 | Matthews | 340/731 |
| 5,297,253 A | 3/1994 | Meisel | 395/160 |
| 5,436,954 A * | 7/1995 | Nishiyama et al. | 455/566 |
| 5,508,978 A * | 4/1996 | Kalbermatter et al. | 368/13 |

(Continued)

FOREIGN PATENT DOCUMENTS

DE 40 10 025 6/1991

(Continued)

OTHER PUBLICATIONS

"Algorithm for Decreasing the Error Rate of Data Entered on a Touch-Sensitive Terminal", *IBM Technical Disclosure Bulletin*, vol. 33 No. 10A, Mar. 1991, pp. 223-227.

Primary Examiner—Kristine Kincaid
Assistant Examiner—Lê Nguyen
(74) Attorney, Agent, or Firm—Crowell & Moring LLP

(57) ABSTRACT

A device for controlling a display screen has an actuating element which can be rotated about a longitudinal axis and moved in the direction of the longitudinal axis, enabling a point of a menu structure consisting of menu, partial menus, functions and/or function values to be selected, and which can be represented as an optically highlighted field in the display screen. The actuating element has an initial position and can describe with relation thereto an additional movement with two additional degrees of freedom. The additional movement of the actuating element enables a field arranged in a marginal region (2) of the display screen and Audio associated with a point of the menu structure to be selected. The rotary/longitudinal movement of the actuating element enables a subordinate field of the menu structure associated with the field arranged in the marginal region of the display screen to be selected in the central region (3) of the display screen enclosed by the marginal region.

8 Claims, 3 Drawing Sheets

U.S. PATENT DOCUMENTS

| | | | |
|---|---|---|---|
| 5,677,949 A * | 10/1997 | Macor | 379/354 |
| 5,841,849 A * | 11/1998 | Macor | 379/142.17 |
| 5,923,327 A * | 7/1999 | Smith et al. | 345/784 |
| 6,078,326 A * | 6/2000 | Kilmer et al. | 345/834 |
| 6,173,194 B1 * | 1/2001 | Vanttila | 455/566 |
| 6,211,874 B1 * | 4/2001 | Himmel et al. | 345/781 |
| 6,437,809 B1 * | 8/2002 | Nason et al. | 345/778 |

FOREIGN PATENT DOCUMENTS

| | | |
|---|---|---|
| DE | 296 04 717 | 7/1996 |
| DE | 196 10 344 | 9/1997 |
| EP | 0 623 870 | 11/1940 |
| EP | 0 366 132 | 5/1990 |
| EP | 0 498 082 | 8/1992 |
| EP | 0 796 766 | 9/1997 |
| WO | WO 96/30822 | 10/1996 |

\* cited by examiner

DEVICE FOR CONTROLLING A DISPLAY SCREEN

BACKGROUND AND SUMMARY OF THE INVENTION

This application is a National Stage of PCT/EP9/07571 filed Nov. 24, 1998 claims the priority of 19752056.1 and 19843421.9, filed Nov. 25, 1997 and Sep. 22, 1998, the disclosures of which are expressly incorporated by reference herein.

The invention relates to a device for controlling a display screen having a rotatable actuating element and moved to enable pointing to a menu structure.

A device of this type is known from European Patent Document EP 0 796 766 A2. In this case, the actuating element is used for increasing the number of planes within the menu structure. It is indicated for this purpose that the planes are to be arranged to be distributed along the circumference of the display screen. This type of a device represents an additional difficulty for the user because there is no clear assignment between the additional movement and the axial or rotational movement of the actuating element. The transition between the planes and within the menu structure also does not develop in a manner that is unclear and finally draws the user's attention away from the traffic situation.

It is an object of the invention to provide a device of the initially mentioned type in the case of which there is a clear assignment between the display screen and the various moving possibilities of the actuating element.

By means of the additional movement of the actuating element, an overriding point of the menu structure is now selected; by means of the rotary/longitudinal movement of the actuating element, a point of the menu structure is selected which is subordinate thereto. In concrete terms, this means, for example, that the possible menus are arranged in the marginal region, while the pertaining submenus or function or function values are situated in the central region. In this case, only the partial menus, the function and function values are arranged in the central region which are part of the one menu preferably selected by a preceding additional movement of the actuating element. Thus, the points which within the menu structure are disposed on the same step are situated in the marginal region, while the hierarchically lower points are located in the central region.

As known from European Patent Document EP 0 796 766 A, the actuating element can carry out a wobbling as well as a parallel displacement as the additional movement and can also be forcibly guided during this movement. The moving possibilities and limitations improve the handling of and the movement within the menu structure. Starting from the central position as the initial position of the actuating element, the additional movement is synonymous with a leaving of the plane of the menu structure indicated in the central region and the selecting of the next-higher plane. The return movement into the starting position, in turn, indicates the transition from the just found higher plane into the next plane situated underneath. As a result, the user is provided with a tactile sense as to how he is moving within the menu structure.

An improvement of the invention relates to the problem of an operating error which may occur in the case of a device of this type. Particularly if a plurality of points are arranged within the frame region of the display screen, the risk of accidentally not "hitting" the desired point is particularly high. Another factor is the special situation in which the selection of these points takes place. The turning to the display screen frequently competes with the traffic situation. The time available for this purpose, as a rule, is very brief.

If the points arranged in the frame area are optically highlighted during and/or after the additional movement and are selected only when the actuating element is at least approximately back in the starting position, the danger of a faulty selection is largely avoided.

Although, by means of the additional movement, it is possible to optically select the point of the menu structure arranged in the frame area, the selection will functionally only take place when the actuating element is back in the starting position. When the device is used in a vehicle for controlling different menus, such as the navigation system, the vehicle computer, the air conditioner, etc. and the assignment of the points arranged in the frame area to the individual menus, the term "functional selection" means the following:

As a result of the additional movement of the actuating element, the section of the marginal region assigned to the respective menu is optically stressed, for example, highlighted. The selection and therefore the controlling of the respective menu, for example, of the navigation, will, however, take place only when, after the optical highlighting of the corresponding marginal region section, the actuating element is returned back into the starting position. Only then will the navigation system be selected, for example, for the vehicle computer, instead of the menu previously shown on the display screen. If, in this case, the partial menus and/or functions and/or function values are displayed as points (for example, in the form of rectangular fields) within the interior surface of the display screen surrounded by the frame region, these points can now be activated preferably by means of the actuating element.

The transition to another menu again requires the preparatory selection of the respective marginal region section by means of the actuating element, in conjunction with the optical highlighting of this section and the subsequent functional selection by returning the actuating element into the starting position.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
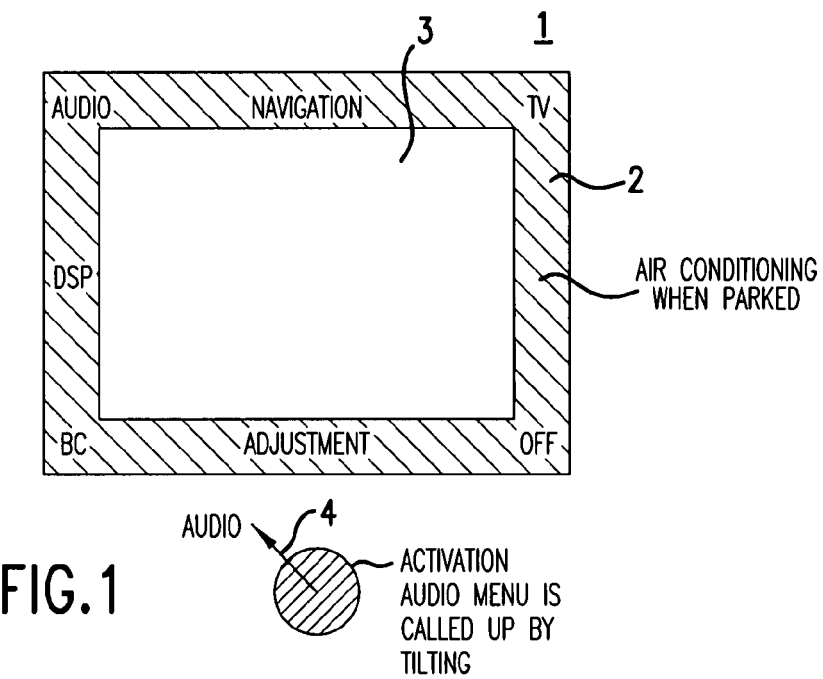
FIG. 1 is a view of a display screen which is used within the scope of the device according to the invention.

FIG. 1 is a basic view of the display screen provided within the scope of the invention. A marginal region 2 and a central region 3 are situated within a display surface 1 which is identical to the picture surface of a display screen. Eight symbols for the menus to be controlled by means of an actuating element, which is not shown, are illustrated in the marginal region 2 at eight points which, with respect to the center point of the picture surface 1, are offset with respect to one another by approximately 45 respectively. These are the audio, navigation, television, parking air conditioner, etc. menus. "Adjustment" means "assigned to all adjustable functions and function values". "Off" indicates the possibility of switching off the display screen.

One of the eight menu points can be selected by an additional movement (wobbling or parallel movement) of the actuating element (not shown). For this purpose, the actuating element must be moved in a direction symbolized by an arrow 4. Here, the "audio" menu point is selected. This selection takes place by moving the actuating element in the direction indicated by the arrow 4 by a distance or an angle which exceeds a defined extent. As a result, the "audio" menu point is selected.

Figure 2:
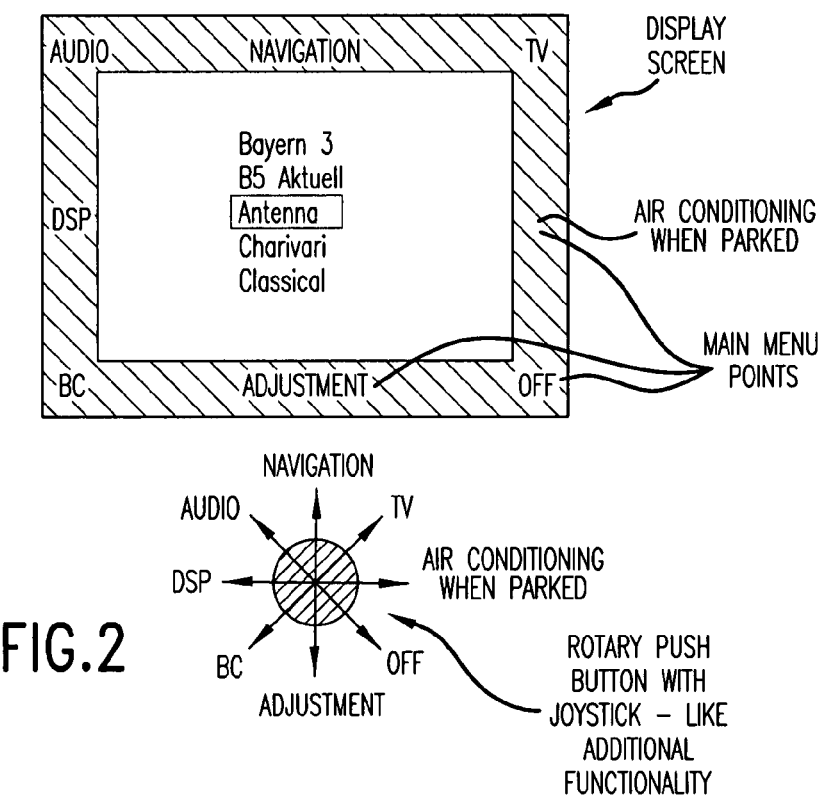
FIG. 2 is a view of the display screen of FIG. 1 when controlled by an actuating element known from European Patent Document EP 0 796 766 A.

After its release, the actuating element returns to its inoperative position under the effect of a restoring force. Simultaneously, the hierarchically subordinate menu points assigned to menu point 4 appear within the display surface 1. These are the transmitting stations fixedly programmed within a radio which is not shown. These are indicated in the central region. This is illustrated in FIG. 2. One of the symbols, here, "antenna", is optically highlighted. This is the symbol of the station which was last selected. If the vehicle user carries out no further adjustments, this station remains tuned in.

If, on the other hand, he wants to change the station, he turns the actuating element about its longitudinal axis. This is a rotary push button, as known from European Patent Document EP 0 366 132 B1 and also described in European Patent Document EP 0 796 766A. In this case, one of the symbols assigned to the other stations, such as "classical", is optically highlighted instead of "antenna". The switching-over to this station takes place in that the rotary push button is moved in the longitudinal direction. Under the effect of a restoring spring, it subsequently moves back into its starting position.

If a switch-over is to now take place to a function of another menu, for example of the BC=vehicle computer menu, the rotary push button must be swivelled in the direction indicated by the arrow BC or displaced parallel thereto. The swivelling is accompanied by the display of the different functions of the vehicle computer in the central region, replacing the station symbols illustrated in FIG. 2. A vehicle computer function, such as the range, can be highlighted as a standard, or can be highlighted after a preparatory axial movement of the rotary push button. The selection of this function, that is, the display of the actual range of the vehicle, can then take place in that the rotary push button is optionally again moved axially. For example, in addition to the optically highlighted "range" symbol, the value of the range, for example, 225 km, will appear in the central region.

Immediately thereafter, a switch-over can take place to the navigation menu in that the additional movement of the rotary push button takes place in the direction of the "Navigation" arrow. The individual navigation parameters appear in the central region.

In this manner, it is possible to rapidly and securely switch between the individual menus, the partial menus, the function and the function values.

Figure 3:
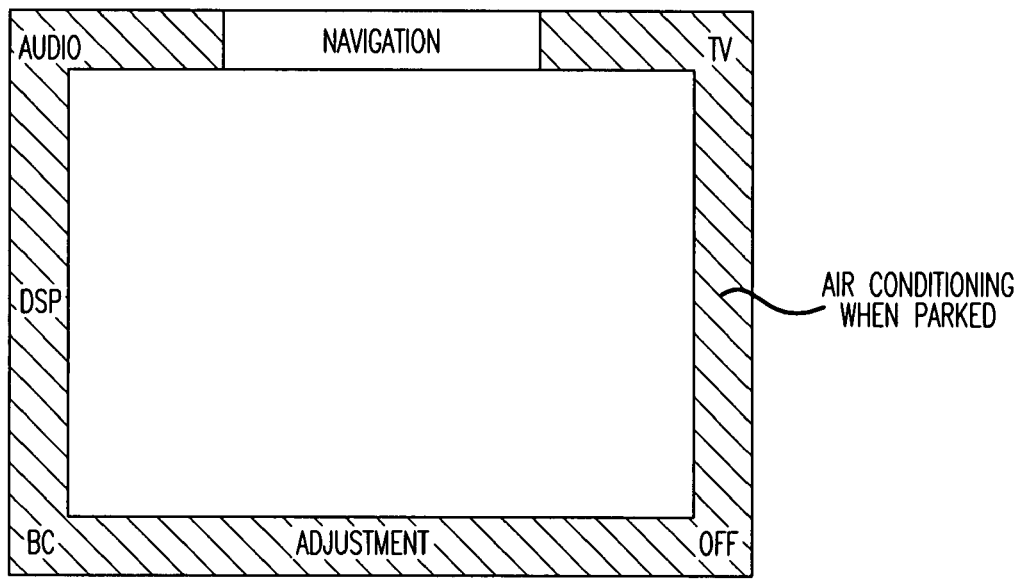
FIG. 3 is a view of a further development of the device of FIGS. 1 and 2.
Figure 3:
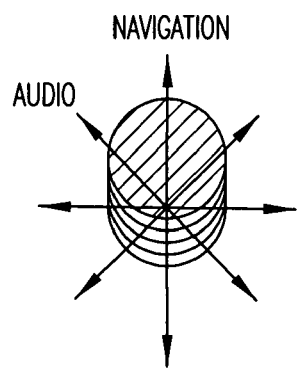

The further development of the invention illustrated by means of FIG. 3 and on consists of not immediately triggering a function change during the translational displacement of the actuating element but of first only carrying out a stressing, for example, a highlighting, of the selected main menu point. As a result, a correction by the operator is still possible at this point in time. The actual triggering of the function takes place only when the spring-centered actuating element is released.

The user wants to call up the "Audio" function range. In the example of FIG. 3, the "Navigation" menu point was accidentally selected in instead of "Audio". If the pertaining submenu were to be called immediately, the user would be in the navigation menu.

Figure 4:
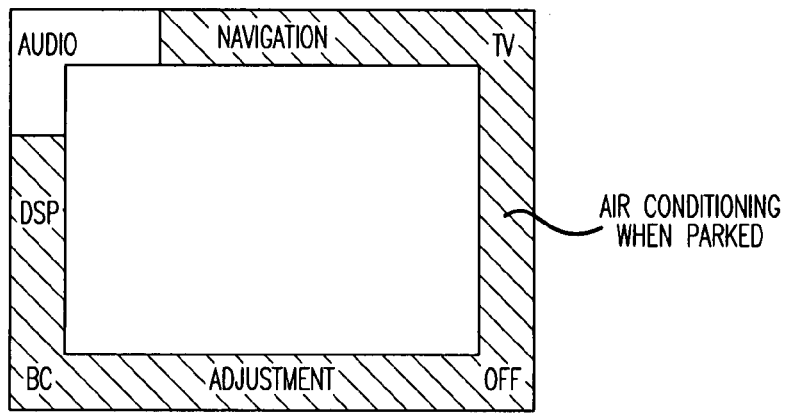
FIGS. 4 and 5 are views of the method of operation of the device of FIG. 3.
Figure 4:
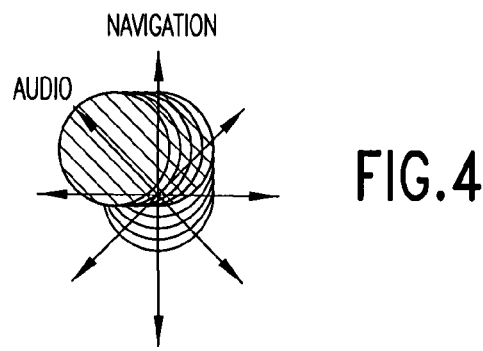
Figure 5:
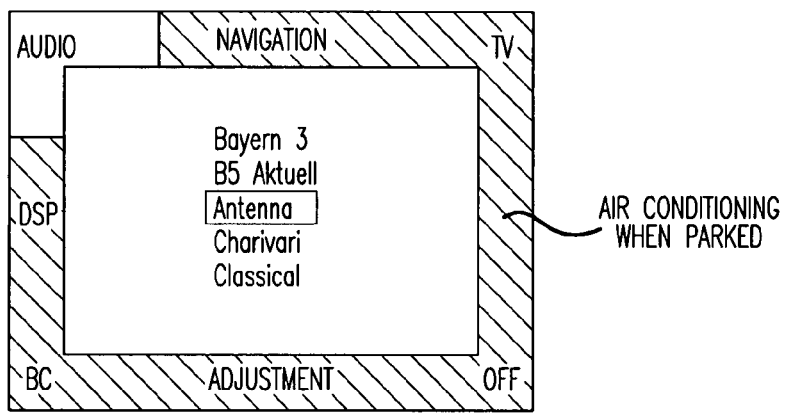
Figure 5:
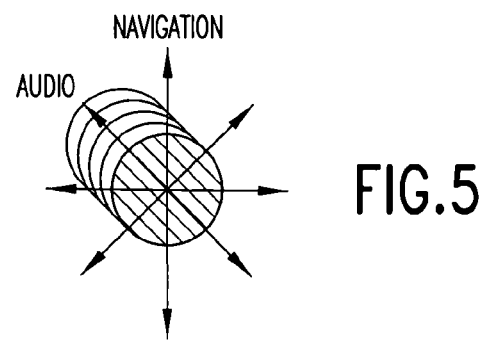

In order to avoid this, the call-up of the respective submenu does not take place immediately at the time of the selection but only when the actuating element is released. In the example, the user recognizes by the stressing of "navigation" that the wrong menu point is selected and can push the actuating element toward the left to the desired "Audio" menu point. This is illustrated in FIG. 4. Also now, the pertaining "Audio" menu is not yet activated.

The invention claimed is:

1. A display control device, comprising:
    a display screen having a marginal region and a central region, the central region of the display screen being enclosed by the marginal region;
    a menu structure displayable on the display screen, the menu structure including at least one of a menu, partial menus, functions, and function values that are selectable;
    an actuating element rotatable about a longitudinal axis and movable in a direction of the longitudinal axis, the actuating element having an initial position and being able to perform an additional movement having two additional degrees of freedom;
    wherein the additional movement of the actuating element enables a field arranged in the marginal region of the display screen and associated with a point of the menu structure to be selected; and
    further wherein at least one of rotation about the longitudinal axis and movement in the direction of the longitudinal axis of the actuating element enables a subordinate field of the menu structure associated with the field in the marginal region of the display screen to be selected in the central region of the display screen.

2. The device according to claim 1, wherein the additional movement is a wobbling movement.

3. The device according to claim 1, wherein the additional movement is a parallel displacement.

4. The device according to claim 2, wherein the actuating element is forcibly guided for the additional movement.

5. The device according to claim 1, wherein the additional movement is a reversible movement.

6. The device according to claim 5, wherein the actuating element carries out the reversible additional movement against the effect of a spring.

7. The device according to claim 1, wherein points arranged in the marginal region are optically highlighted at least one of during and after the additional movement, and wherein the points are selected only when the actuating element is substantially in the initial position.

8. The device according to claim 1, wherein, when the field is selected in the marginal region, assigned selectable fields in the central region are automatically indicated.

* * * * *